(12) United States Patent
Capps, Jr.

(10) Patent No.: US 10,513,048 B2
(45) Date of Patent: *Dec. 24, 2019

(54) AUTOMATED CORE VENEER FEEDER AND LAYER FOR MANUFACTURING PLYWOOD

(71) Applicant: Georgia-Pacific Wood Products LLC, Atlanta, GA (US)

(72) Inventor: J. T. Capps, Jr., Huntington, TX (US)

(73) Assignee: Georgia-Pacific Wood Products LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,284

(22) Filed: Sep. 7, 2018

(65) Prior Publication Data

US 2019/0001519 A1    Jan. 3, 2019

Related U.S. Application Data

(63) Continuation of application No. 14/847,102, filed on Sep. 8, 2015, now Pat. No. 10,076,849.

(60) Provisional application No. 62/047,143, filed on Sep. 8, 2014.

(51) Int. Cl.
| | | |
|---|---|---|
| *B27D 1/04* | (2006.01) | |
| *B32B 41/00* | (2006.01) | |
| *B32B 38/18* | (2006.01) | |
| *B32B 37/18* | (2006.01) | |
| *B32B 21/14* | (2006.01) | |
| *B32B 21/13* | (2006.01) | |
| *B65H 3/08* | (2006.01) | |

(52) U.S. Cl.
CPC ............ *B27D 1/04* (2013.01); *B32B 38/1833* (2013.01); *B32B 41/00* (2013.01); *B65H 3/0833* (2013.01); *B32B 21/13* (2013.01); *B32B 21/14* (2013.01); *B32B 37/18* (2013.01); *B32B 2607/00* (2013.01); *B65H 2553/42* (2013.01); *B65H 2701/1938* (2013.01)

(58) Field of Classification Search
CPC ..... B32B 38/1833; B32B 41/00; B32B 21/13; B32B 21/14; B32B 2607/00; B32B 37/18; B27D 1/06; B27D 1/04
See application file for complete search history.

(56) References Cited

U.S. PATENT DOCUMENTS

| | | |
|---|---|---|
| 3,580,778 A | 5/1971 | Larson |
| 3,620,887 A | 11/1971 | Nelson |
| 3,666,592 A | 5/1972 | Keller et al. |
| 3,725,183 A | 4/1973 | Brookhyser et al. |
| 4,797,169 A | 1/1989 | Aizawa |
| 5,695,596 A | 12/1997 | Seguin |
| 6,085,813 A | 7/2000 | Elliott |
| 6,543,604 B1 | 4/2003 | Pung |
| 6,811,647 B1 | 11/2004 | Graf |

(Continued)

OTHER PUBLICATIONS

European Search Report for EP Application No. 15839910.5; dated Jan. 5, 2018; 9 pgs.

*Primary Examiner* — George R Koch (57) ABSTRACT

A method for manufacturing plywood includes receiving a face sheet on a main conveyor and feeding a plurality of pieces of core veneer onto a veneer conveyor by an automated core veneer feeder. The method also includes removing one or more of the plurality of pieces of core veneer from the veneer conveyor and placing the one or more of the plurality of pieces of core veneer onto the face sheet.

5 Claims, 6 Drawing Sheets

(56) References Cited

U.S. PATENT DOCUMENTS

| | | | |
|---|---|---|---|
| 10,076,849 B2* | 9/2018 | Capps, Jr. ................ | B27D 1/04 |
| 2009/0243194 A1 | 10/2009 | Gibson | |
| 2011/0057384 A1 | 3/2011 | Perttila | |
| 2012/0328405 A1 | 12/2012 | Perttila et al. | |

* cited by examiner

AUTOMATED CORE VENEER FEEDER AND LAYER FOR MANUFACTURING PLYWOOD

CROSS-REFERENCE TO RELATED APPLICATIONS

This application is a continuation of U.S. patent application Ser. No. 14/847,102, filed on Sep. 8, 2015, now U.S. Pat. No. 10,076,849 B2, which claims priority to U.S. Provisional Patent Application No. 62/047,143, filed on Sep. 8, 2014, which are both incorporated by reference herein.

BACKGROUND

The present invention generally relates to the field of plywood manufacturing, and more specifically to an automated core veneer feeder and an automated core veneer layer for manufacturing plywood.

Plywood consists of three basic components, a face sheet, a back sheet, and a core material, also referred to as cross band, disposed in between the face sheet and the back sheet at 90 degrees. In general, plywood is made by manually placing one or more layers of core material in between the face sheet and the back sheet.

In some applications, at least one layer of the core material is made of multiple pieces of veneer that are smaller than the face and back sheet in at least one dimension. Currently in these applications, the smaller pieces of veneer are manually fed onto a conveyor system by a first operator and then are manually taken off of the conveyor and placed on either the face or back sheet by a second operator. The second operator ensures that the veneers pieces are precisely placed with no laps or gaps. This process is not only labor intensive, but it also limits the speed at which the plywood can be manufactured.

Accordingly, an automated core veneer feeder and automated core veneer layer for manufacturing plywood are desired.

SUMMARY

According to one embodiment of the present disclosure, a method for manufacturing plywood includes receiving a face sheet on a main conveyor and manually feeding a plurality of pieces of core veneer onto a veneer conveyor by an automated core veneer feeder. The method also includes removing one or more of the plurality of pieces of core veneer from the veneer conveyor and placing the one or more of the plurality of pieces of core veneer onto the face sheet.

According to another embodiment of the present disclosure, an automated core veneer feeder includes a pair of sweed rolls that receive pieces of core veneer and to feed the pieces of core veneer onto a veneer conveyor, a vision system that scans a stack of core veneers and identifies a size and placement of each of the core veneers on the stack and a vacuum feeder assembly that lifts individual pieces of core veneer off of the stack by turning selectively activating one or more vacuum cups. The automated core veneer feeder also includes a processor that receives input signals from the vision system and at least one of a controller or one or more sensors in the veneer conveyor and that responsively controls the pair of sweed rolls and the vacuum feeder assembly.

According to a further embodiment of the present disclosure, an automated core veneer layer includes an advanced veneer conveyor having one or more sensors configured to detect one or more of pieces of core veneer on the advanced veneer conveyor and a processor that receives input signal from the one or more sensors and responsively calculates a position and a size of the one or more of pieces of core veneer on the advanced veneer conveyor. The automated core veneer layer also includes one or more actuators that individually move each of the one or more of pieces of core veneer on the advanced veneer conveyor into a desired position, wherein the one or more actuators are controlled by the processor.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The invention is described in detail below with reference to the figures for purposes of illustration only. Modification to various embodiments illustrated within the spirit and scope of the present invention, will be readily apparent to one of skill in the art.

Figure 1A:
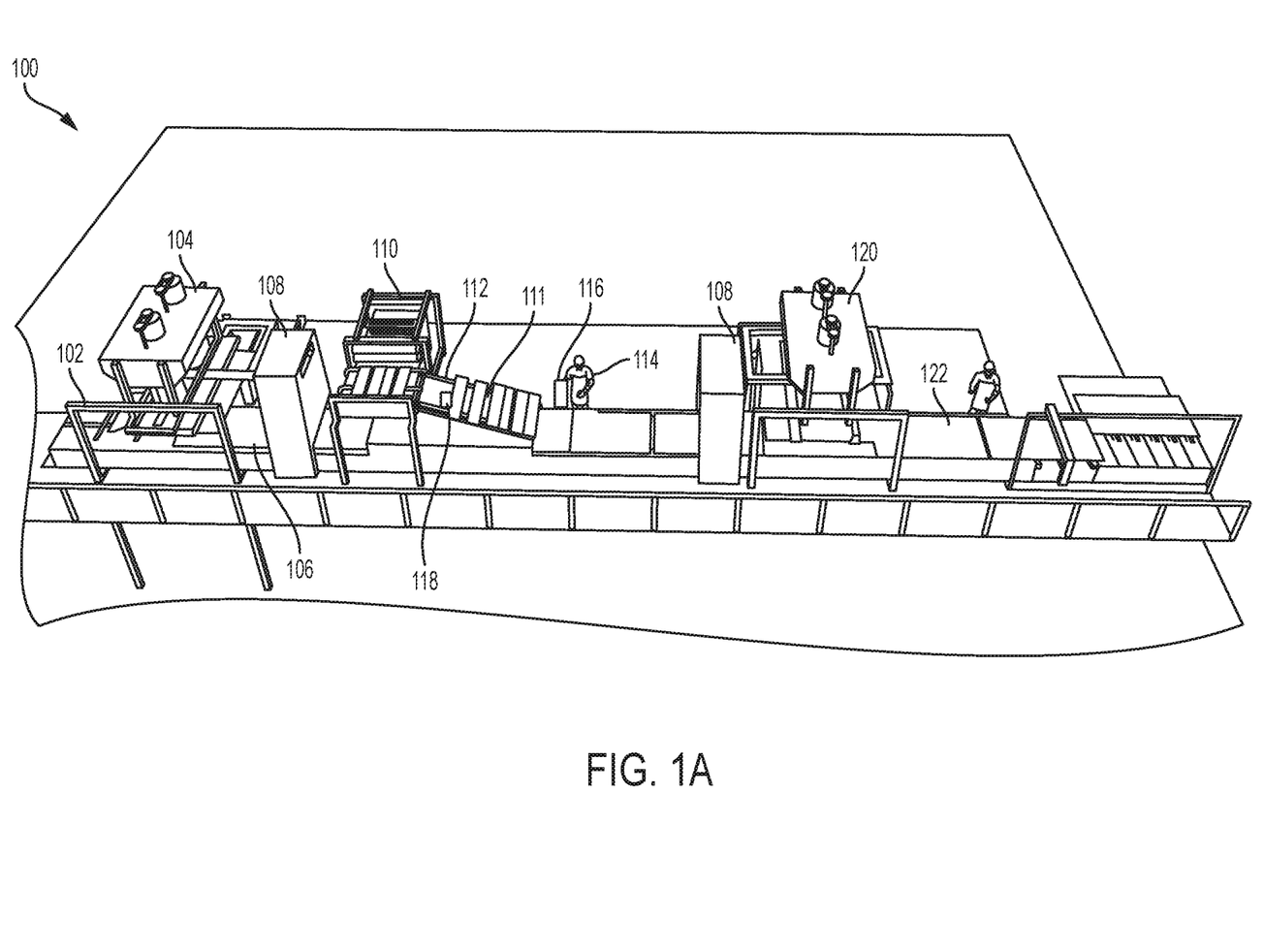
FIGS. 1A and 1B are perspective views illustrating a system for manufacturing plywood having an automated core veneer feeder in accordance with an exemplary embodiment.
Figure 1B:
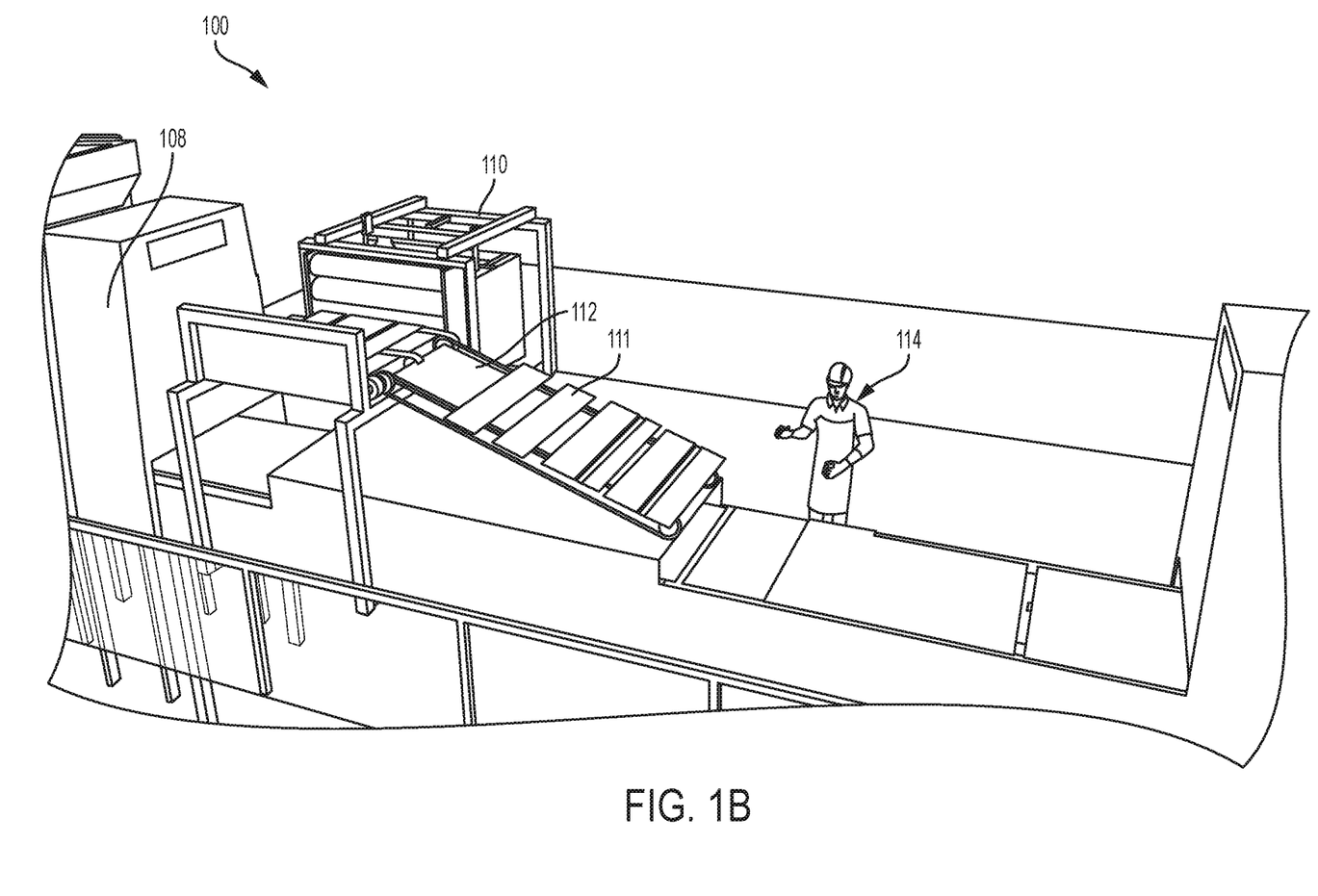

Referring now to FIGS. 1A and 1B, a system 100 for manufacturing plywood having an automated core veneer feeder in accordance with an exemplary embodiment is shown. As illustrated, the system 100 includes a main conveyor 102 which extends through the entire manufacturing line. The system 100 also includes a face sheet apparatus 104, disposed near a first end of the main conveyor 102, which is configured to place face sheets 106 onto the main conveyor 102. After the face sheets 106 are placed onto the main conveyor 102, the face sheets 106 are then moved through a glue application station 108 where an adhesive is applied to an upper surface of the face sheets 106.

In exemplary embodiments, the system 100 includes an automated core veneer feeder 110 which feeds pieces of core veneer 111 onto a veneer conveyor 112. In one embodiment, the veneer conveyor 112 moves the pieces of core veneer 111 to an assembly station where an operator 114 places the pieces of core veneer 111 on top of the face sheets 106. In another embodiment, the veneer conveyor 112 moves the pieces of core veneer 111 to and places the pieces of core veneer 111 on top of the face sheets 106; the operator 114 then adjusts the alignment of the pieces of core veneer 111 as needed. In exemplary embodiments, the operator 114 ensures that there are no gaps between the adjacent pieces of core veneer 111 and that the adjacent pieces of core veneer 111 do not overlap when positioned on the face sheet 106.

In exemplary embodiments, the operator 114 may use a controller 116 to control the operation of the automated core veneer feeder 110. In exemplary embodiments, the controller 116 is used to instruct the automated core veneer feeder 110 to feed additional pieces of core veneer 111 onto the veneer conveyor 112. In one embodiment, the controller 116 may be a remote that includes one or more buttons. In another embodiment, the controller 116 may be a pedal controller or an optical sensor that the operator can use with one of his hands or feet to signal that additional pieces of core veneer 111 need to be dispensed onto the veneer conveyor 112.

In exemplary embodiments, the operation of the automated core veneer feeder 110 may be completely automated. In these embodiments, one or more sensors 118 may be disposed along the veneer conveyor 112 and the sensors 118 can be used to determine the number of pieces of core veneer 111 on the veneer conveyor 112. The automated core veneer feeder 110 can be configured to monitor the sensors 118 and to automatically feed additional pieces of core veneer 111 onto the veneer conveyor 112 if the sensors 118 indicate that the number of pieces of core veneer 111 on the veneer conveyor 112 is below a threshold minimum amount. Alternatively, the automated core veneer feeder 110 can be configured to monitor the sensors 118 and to continuously feed additional pieces of core veneer 111 onto the veneer conveyor 112 until the sensors 118 indicate that the number of pieces of core veneer 111 on the veneer conveyor 112 has reached a desired amount.

Continuing with reference to FIG. 1, after the pieces of core veneer 111 are properly positioned on the face sheet 106, the main conveyor 102 moves the face sheets 106 with the properly positioned pieces of core veneer 111 through a second glue application station 108 and an adhesive is applied to an upper surface of pieces of core veneer 111. After the second glue application station 108, the main conveyor 102 moves the face sheets 106 with the properly positioned pieces of core veneer 111 to a back sheet apparatus 120, which places a back sheet 122 on top of the face sheets 106 and the pieces of core veneer 111. After back sheet 122 is placed the loosely assembled plywood panel(s) are cut into 99" individual sheets, stacked and prepared for pressing. FIG. 1 illustrates a three-ply panel construction; face, core veneer and back. Those of ordinary skill in the art will appreciate that the methods and systems disclosed herein can be used for panel constructions that are more than three-ply.

Figure 2:
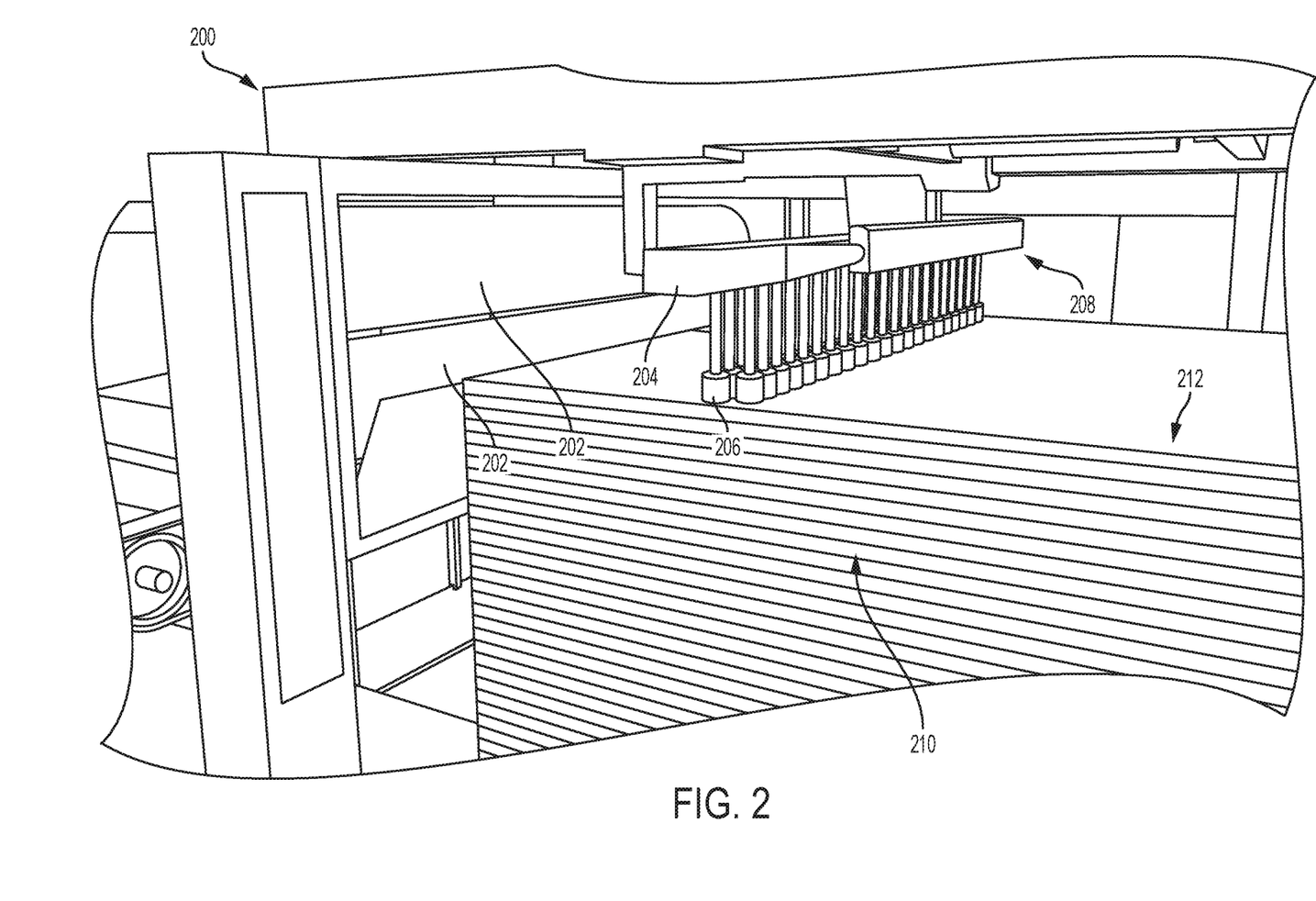
FIG. 2 is a perspective view illustrating an automated core veneer feeder for manufacturing plywood in accordance with an exemplary embodiment.

Referring now to FIG. 2, an automated core veneer feeder 200 for manufacturing plywood in accordance with an exemplary embodiment is shown. The automated core veneer feeder 200 includes a pair of sweed rolls 202 that are configured to receive pieces of core veneer 212 and to feed the pieces of core veneer 212 onto a veneer conveyor. In exemplary embodiments, the pieces of core veneer 212 are stored in a stack 210 adjacent to the sweed rolls 202. The automated core veneer feeder 200 includes a vision system 208 that is configured to scan the top of the stack 210 of core veneers 212 and to be able to identify the size and placement of each of the core veneers 212 on the top of the stack 210.

In exemplary embodiments, the automated core veneer feeder 200 includes a vacuum feeder assembly 204 that is configured to lift individual pieces of core veneer 212 off of the stack 210 by turning on and off one or more vacuum cups 206. In exemplary embodiments, the vacuum feeder assembly 204 is capable of picking up multiple pieces of core veneer 212 from the top of the stack 210 at one time using the vacuum cups 206. Once the vacuum feeder assembly 204 lifts the pieces of core veneer 212 from the top of the stack 210, the vacuum feeder assembly 204 moves the pieces of core veneer 212 towards the sweed rolls 202. After the pieces of core veneer 212 make contact with the sweed rolls 202, the vacuum cups 206 will release the pieces of core veneer 212, allowing the pieces of core veneer 212 to be fed through the sweed rolls 202 and on to a veneer conveyor.

Figure 3:
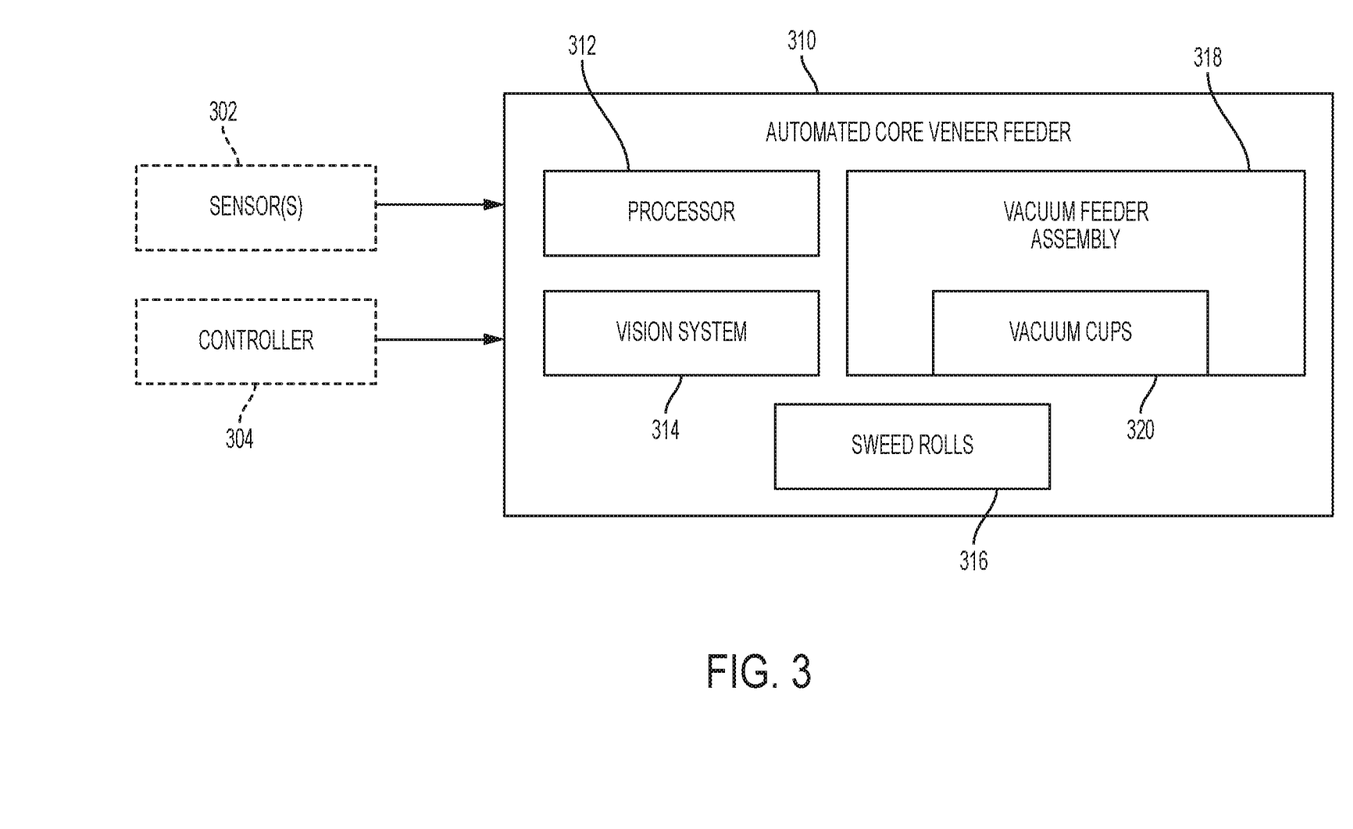
FIG. 3 is a block diagram illustrating an automated core veneer feeder in accordance with an exemplary embodiment.

Referring now to FIG. 3, a block diagram of an automated core veneer feeder 310 in accordance with an exemplary embodiment is shown. As illustrated, the automated core veneer feeder 310 includes a processor 312, a vision system 314, sweed rolls 316 and a vacuum feeder assembly 318. The processor 312 may be a simple processor such as an ASIC or FPGA or it may be a traditional microprocessor. In exemplary embodiments, the processor 312 may receive input signals from one or more sensors 302, a controller 304 and/or the vision system 314 and responsively control the operation of the vacuum feeder assembly 318 and/or the sweed rolls 316.

In exemplary embodiments, the processor 312 receives a signal from either the controller 304 or the one or more sensors 302 which indicates that additional pieces of core veneer need to be placed on the veneer conveyor. In response to receiving such a signal, the processor 312 uses the vision system 314 to identify individual pieces of core veneer located on the core veneer stack. Once the individual pieces of core veneer have been identified, the processor 312 instructs the vacuum feeder assembly 318 to lift the identified individual pieces of core veneer with one or more vacuum cups 320. After the pieces of core veneer have been lifted, the processor 312 instructs the vacuum feeder assembly 318 to move the individual pieces of core veneer to contact the sweed rolls 316. In exemplary embodiments, the processor 312 may also control the operation of the sweed rolls 316 including when the sweed rolls 316 will be active and the speed of the sweed rolls 316.

Figure 4:
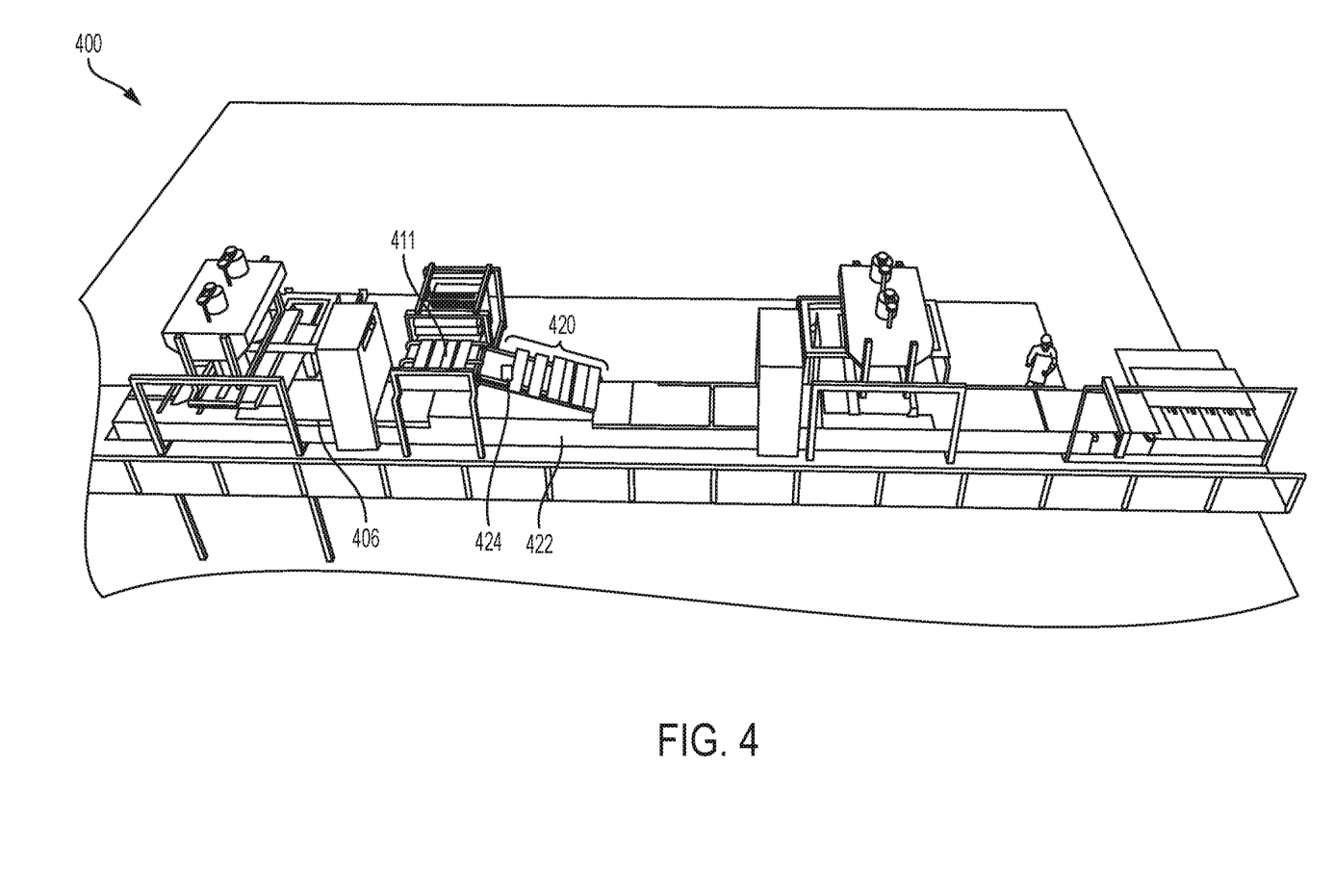
FIG. 4 is a perspective view illustrating a system for manufacturing plywood having an automated core veneer feeder and an automated core veneer layer in accordance with an exemplary embodiment.

Referring now to FIG. 4, a system 400 for manufacturing plywood having an automated core veneer feeder and an automated core veneer layer in accordance with an exemplary embodiment is shown. The system 400 is largely the same as the system 100 shown in FIGS. 1A and 1B and the portions of the system 400 that are the same will not be discussed in further detail. In the system 400, the operator 114 of FIGS. 1A and 1B, has been replaced with an automated core veneer layer 420.

In exemplary embodiments, the automated core veneer layer 420 includes an advanced veneer conveyor system 422 that is capable of individually moving pieces of core veneer 411 in multiple directions. The advanced veneer conveyor system 422 is also capable of placing the pieces of core veneer 411 onto the face sheet 406. In addition, the automated core veneer layer 420 includes a plurality of sensors 424 that are configured to detect the pieces of core veneer 411 on the advanced veneer conveyor system 422. In exemplary embodiments, the sensor 424 may be optical sensors, weight sensors, or the like. The automated core veneer layer 420 further includes a processor configured to receive signals from the sensors 424 and to responsively calculate both the position and size of each of the pieces of core veneer 411 on the advanced veneer conveyor system 422. Once the position and size of the pieces of core veneer 411 on the advanced veneer conveyor system 422 is known, the processor instructs the advanced veneer conveyor system 422 to move the pieces of core veneer 411 to properly align the pieces of core veneer 411. In exemplary embodiments, the proper alignment of the pieces of core veneer 411 ensures that there are no gaps between the adjacent pieces of core veneer 411 and that the adjacent pieces of core veneer 411 do not overlap. In addition, the proper alignment may ensure that at least one edge of all of the pieces of core veneer 411 are aligned in a straight line. Once each piece of core veneer 411 is properly aligned by the advanced veneer conveyor system 422, the advanced veneer conveyor system 422 places each piece of core veneer 411 on top of an upper surface of a face sheet 406.

In one embodiment, the advanced veneer conveyor system 422 is configured to place the pieces of core veneer 411 on top of an upper surface of a face sheet 406 in a continuous manner such that there are no gaps between the pieces of core veneer 411 and such that gaps between adjacent piece of face sheets 406 are covered by the pieces of core veneer 411. In another embodiment, the advanced veneer conveyor system 422 is configured to place the pieces of core veneer 411 on top of an upper surface of a face sheet 406 in a manner such that the gaps between adjacent piece of face sheets 406 are not completely covered by the pieces of core veneer 411.

Figure 5:
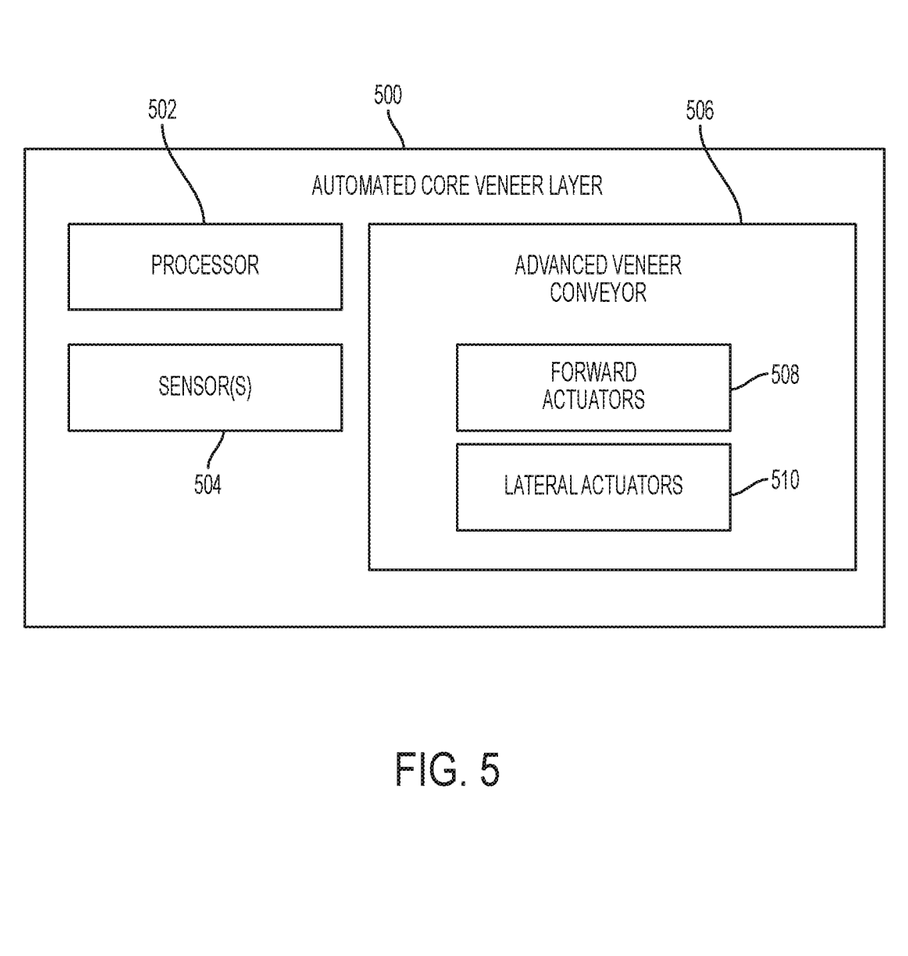
FIG. 5 is a block diagram illustrating an automated core veneer layer in accordance with an exemplary embodiment.

FIG. 5 is a block diagram illustrating an automated core veneer layer 500 in accordance with an exemplary embodiment. In exemplary embodiments, the automated core veneer layer 500 includes a processor 502, one or more sensors 504 and an advanced veneer conveyor 506. The processor 502 may be a simple processor such as an ASIC or FPGA or it may be a traditional microprocessor. In exemplary embodiments, the processor 502 receives input signal from the one or more sensors 504 and responsively calculates both the position and size of the pieces of core veneer on the advanced veneer conveyor 506. In exemplary embodiments, the one or more sensors 504 are disposed along the advanced veneer conveyor 506 and may include, but are not limited to, optical sensors, weight sensors, and the like. Based on the calculated size and position of the of the pieces of core veneer on the advanced veneer conveyor 506, the processor 502 uses one or more of a forward actuators 508 and lateral actuators 510 to individually move each of the pieces of core veneer on the advanced veneer conveyor 506 into a desired position. In exemplary embodiments, the forward actuators 508 can be used to move an individual piece of core veneer up and down the advanced veneer conveyor 506 and the lateral actuators can be used to move an individual piece of core from side to side on the advanced veneer conveyor 506.

In exemplary embodiments, a system for manufacturing plywood having an automated core veneer feeder and an automated core veneer layer can substantially reduce the labor costs associated with manufacturing plywood. In addition, such systems may also increase the speed and efficiency of the plywood manufacturing process, quality and raw materials utilization. In exemplary embodiments, an automated core veneer feeder may be used to replace an operator that is currently used to feed individual pieces of core veneer onto a veneer conveyor. Likewise, an automated core veneer layer may be used to replace an operator that is currently used to remove individual pieces of core veneer from the veneer conveyor and place the individual pieces of core veneer on a face sheet.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for manufacturing plywood, comprising:
receiving a face sheet on a main conveyor;
feeding a plurality of pieces of core veneer onto a veneer conveyor;
detecting each of the plurality of pieces of core veneer on the veneer conveyor by one or more sensors in the veneer conveyor;
calculating, by a processor based on data received from the one or more sensors, a position and a size of each of the plurality of pieces of core veneer on the veneer conveyor;
aligning the plurality of pieces of core veneer by one or more actuators in the veneer conveyor, wherein the one or more actuators are directed by the processor to individually move the each of the plurality of pieces of core veneer on the veneer conveyor in a plurality of directions, wherein the aligning ensures that there are no gaps between adjacent pieces of core veneer and that the adjacent pieces of core veneer do not overlap,
removing one or more of the plurality of pieces of core veneer from the veneer conveyor after the one or more of the plurality of pieces of core veneer have been properly aligned; and
placing the one or more of the plurality of pieces of core veneer onto the face sheet.

2. The method of claim 1, wherein an automated core veneer feeder feeds the plurality of pieces of core veneer onto the veneer conveyor.

3. The method of claim 2, wherein the automated core veneer feeder feeds additional pieces of core veneer onto the veneer conveyor based on a determination that a number of pieces of core veneer on the veneer conveyor is below a desired threshold.

4. The method of claim 2, wherein the automated core veneer feeder continuously feeds pieces of core veneer onto the veneer conveyor until a determination is made that a number of pieces of core veneer on the veneer conveyor exceeds a maximum threshold.

5. The method of claim 2, wherein an automated core veneer layer removes and places the one or more of the plurality of pieces of core veneer.

\* \* \* \* \*